J. M. HAMILTON.
ANTIFRICTION SPRING.
APPLICATION FILED APR. 30, 1917.
1,258,561.
Patented Mar. 5, 1918.
2 SHEETS—SHEET 2.
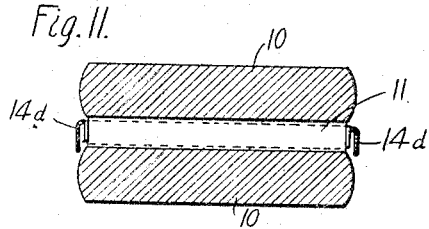
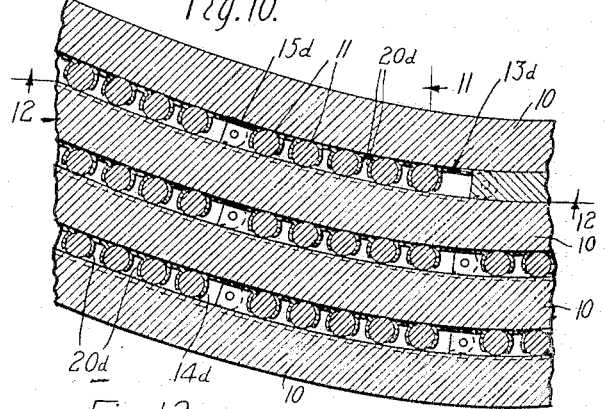
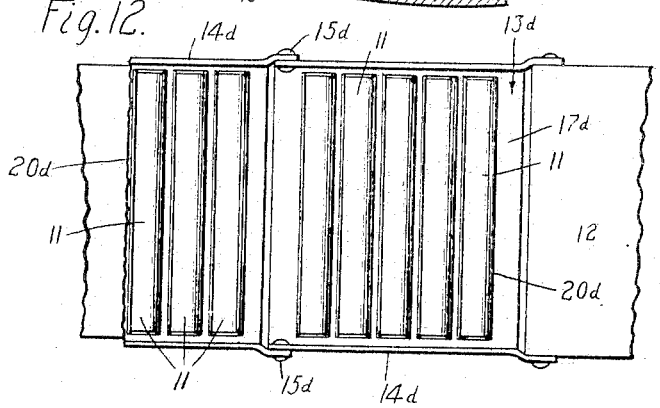
Inventor
John M. Hamilton,
by James T. Pendleton
his Attorney.

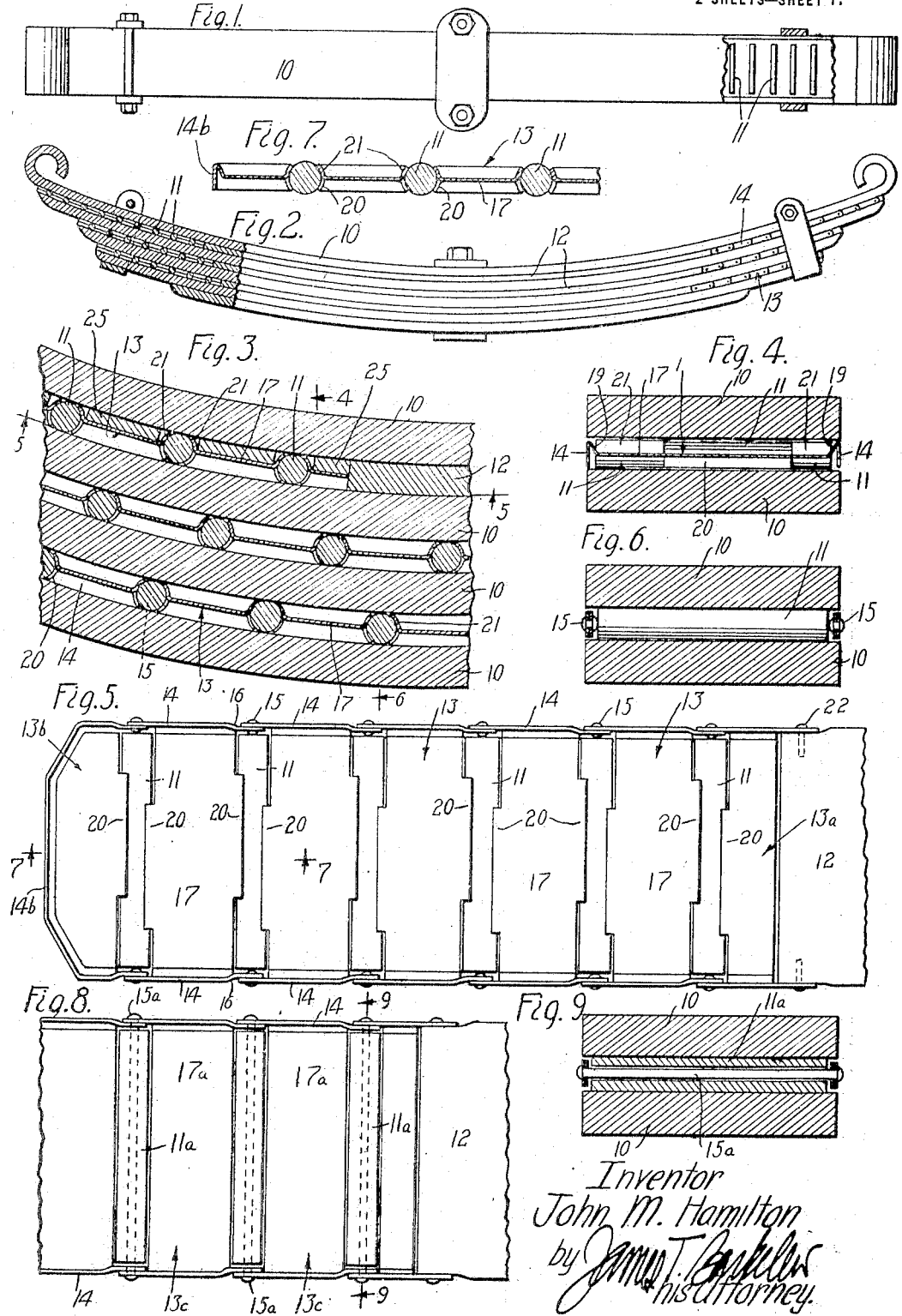

UNITED STATES PATENT OFFICE.

JOHN M. HAMILTON, OF LOS ANGELES, CALIFORNIA.

ANTIFRICTION-SPRING.

1,258,561.

Specification of Letters Patent.

Patented Mar. 5, 1918.

Application filed April 30, 1917. Serial No. 165,337.

*To all whom it may concern:*

Be it known that I, JOHN M. HAMILTON, a citizen of the United States, residing at Los Angeles, in the county of Los Angeles, State of California, have invented new and useful Improvements in Antifriction-Springs, of which the following is a specification.

This invention relates to springs such as are used upon automobiles, railway carriages and other vehicles; and it is a primary object of this invention to provide a spring, or provide a device which may be attached to or built into a spring of the character described, which device will efficiently obviate and do away with the friction usually generated between the superimposed leaves of such spring.

Among the particular objects of this invention I may mention the following: the provision of a device in such form as to not interfere with the flexible movements of the spring; the provision of means for excluding foreign matter, such as the dust and grime from roads; and the provision of the device in such form as to be easily and efficiently lubricated. It is also an object to provide a device in such form that the assembly of duplicate units will provide for different lengths of springs. And it is generally an object to provide a device which is simple and inexpensive, which will reduce the friction to a negligible quantity, and which, when once installed, needs practically no attention, or very little attention.

I prefer to use rollers as the rolling bearing elements; but this is not necessarily the case as, for instance, balls may be used instead of rollers. Specific organizations and constructions are described in the following detailed specification, and for the purpose of this specification reference is had to the accompanying drawing in which Figure 1 is a plan, parts being broken away for the purpose of illustration, of a spring equipped with my invention; Fig. 2 is a partial side elevation and partial longitudinal section of the same; Fig. 3 is an enlarged detail section showing a part of what is shown in Fig. 2; Fig. 4 is a cross section taken as indicated by line 4 on Fig. 3; Fig. 5 is a view taken as indicated by line 5—5 on Fig. 3; Fig. 6 is a section taken as indicated by line 6 on Fig. 3; Fig. 7 is a section taken as indicated by line 7—7 on Fig. 5; Fig. 8 is a view somewhat similar to Fig. 5, showing a modified form of construction; Fig. 9 is a section similar to that of Figs. 4 and 6, but taken as indicated by line 9—9 on Fig. 8; Fig. 10 is a view similar to Fig. 3 showing another modified construction; Fig. 11 is a section taken as indicated by line 11 on Fig. 10; and Fig. 12 is a view taken as indicated by line 12 on Fig. 10.

In the drawings I have shown a spring including the usual spring leaves 10. These spring leaves 10 may be of any size, resiliency, stiffness and number. According to my invention I place between the leaves the rolling bearing 11. These rolling bearings are preferably in the form of rollers, as illustrated, the rollers being of a length slightly less than the width of the spring leaves. Fig. 2 shows a preferred arrangement of the rolling bearings. In the ordinary spring it is not necessary to continue the rolling bearings through the central parts of the spring; but the spaces between the central parts of the leaves are filled by members 12 which may be, and preferably are, auxiliary spring members. However, the particular characteristics of these members 12 is not a part of the subject matter of the present invention. In my copending application, Serial No. 136,133, filed December 11, 1916, I have set forth and claimed the auxiliary spring members and their combination with anti-friction devices. This present application is restricted to anti-friction devices alone.

In a preferred arrangement the rolling bearings extend from the end of each leaf part way to the center, as is clearly shown in Fig. 2. However, this arrangement may be modified according to particular and specific requirements. In the usual spring, the greatest amount of relative movement of the leaves takes place not at the center but at the outer portions of the leaves; while the relative movement of the leaves near the center is practically negligible. In any case the rolling bearings will extend in far enough toward the center to eliminate any substantial friction caused by relative movements of the leaves.

In Figs. 3, 4, 5, 6 and 7 I show my now preferred form of structure and of detail. The anti-friction bearing rollers 11 are held in a flexible spacing member, which is also a bearing holding member; and these members are preferably made up of individual frames flexibly connected together by being pivoted.

In the form shown in these figures, these frames 13 are preferably each formed as an integral whole from a plate of sheet metal, and have side flanges 14 which stand flush with the side edges of the spring leaves 10. These flanges 14 are pivoted one to another at 15; one end of each flange being inwardly offset at 16 so that it may overlap the other adjacent end of a flange on an adjacent frame. The body or plate 17 of each spacer frame stands about centrally in the space between adjacent spring leaves 10 and substantially in the plane of the centers of the rollers 11. To form the side flanges 14 the plate is bent upwardly along its two opposite side edges, as shown at 19, and then back downwardly to form the flanges 14, so that the upper edges of the flanges 14 nearly touch the spring leaf 10 above them, while the lower edges of flanges 14 are made to nearly touch the spring leaf 10 below them. It will be readily seen that the collective flanges 14 close the spaces between the adjacent spring leaves against the entry of dust or other foreign matter; but the flanges being pivoted together, do not interfere with the flexible movement of the spring leaves. In order that the flanges do not interfere with the flexibility of the spring leaves, the flanges, and the frames 13, are made relatively short.

In the form shown in Figs. 3 to 7 I show the frames 17 as being of a length corresponding to the longitudinal spacings between the rollers 11. The pivotal connections 15 are co-axial with the rollers 11, and each roller is held between flanges 20 and 21 at the opposing ends of adjacent spacing frames. The flanges 20 are turned downwardly from the ends of the plates 17, while the flanges 21 are turned upwardly. Flanges 21 are situated at the sides of each end of each plate 17, while flanges 20 are situated medially of each end of each plate 17. The flanges 20 are arranged in staggered relation. It will be seen that the flanges, standing as they do at angles to the plates 17, reinforce the plate and stiffen it against being bent or deformed from its proper flat form. If the flanges 20 were placed exactly opposite each other, then the non-reinforced parts (at the ends of flanges 20 and 21) on the opposite end edges of each plate would be directly opposite each other; and the plate would therefore be more easily bent along a line which would extend directly along the plate 17 in a general longitudinal direction from the end of a flange 20 to the end of the opposite flange 20. By staggering the flanges 20 this line of least resistance to bending is placed diagonally across the plate, so that bending is not so liable to occur. It is important that the plate 17 be maintained in proper flat shape, so that the flanges 20 and 21 may properly confine the rollers without binding upon them. Preferably, the rollers are somewhat loosely held between the opposing sets of flanges. Furthermore, the flanges are made of such extent that they securely hold the rollers against accidental displacement from the spacing and holding means, when the devices are in the conformation shown in the drawings. However, by flexing two adjacent spacing frames about their pivotal connection until a position is reached where either the flanges 20 or the flanges 21 are abutted edgewise against each other, the other flanges are spread apart so that the rollers may be removed and inserted.

The specific form of device which has now been just explained embodies the main features of my invention and also contains several specifically advantageous features. It is advantageous to construct the device in the manner described, on account of simplicity of manufacture and simplicity of assembly and efficiency of operation. It is advantageous to have the flexibility of the bearing spacing means occur co-axially with the bearings themselves, because no interference is then made with the proper engagement of the bearing rollers with the surfaces of the spring leaves.

At the inner end of each chain of spacing frames there is a special spacing frame 13$^a$ which, instead of being pivoted to the next spacing frame, is pivoted at 22 to the member 12. At the outer end of each chain of spacing frames there is a special member 13$^b$ pivoted to the outermost frame 13 in the manner hereinbefore described; but this special member 13$^b$ has a flange 14$^b$ extending completely around its outer end, so as to close the space between the spring leaves at the outer end to prevent entry of dust and other foreign matter.

Although lubrication of the anti-friction bearings is not as important a matter as the lubrication of an ordinary leaf spring, yet it is desirable to lubricate the bearings. This I may do by merely dropping a small amount of lubricant into the outermost frame 13$^b$. This lubricant will work onto the outermost roller 11 and be carried by the movement of that roller over onto the next frame 13, and so on, until it is carried onto all of the rollers; and any surplus will then run off the innermost frame 13$^a$ and will work in between the spring leaves 10 and members 12. This lubricating action is possible because the frames 13 are preferably imperforate and will carry the lubricant from one roller to the next. In fact, these members 13 may be used as trays for carrying a charge grease or the like; or small blocks 25 of suitable lubricant carrying material, such as felt, may be inserted in the members 13 on the plate 17. If this is done, or if the frames are filled with a lubricant, such as grease, in any suitable manner, the device needs exceptionally little attention, being always perfectly oiled and protected against the entry of foreign matter. Any lubricant, to get out of the frames, must pass through the center part of the opening which holds the roller. The side flanges 21 project upwardly and prevent the downward movement of oil at the sides. Consequently, the oil is always kept in toward the center of the leaves and does not flow out at the edges.

In Figs. 8 and 9 I illustrate a modified form of structure in which the spacing frames 13$^c$ have no flanges 20 and 21; but the rollers 11$^a$ are hollow; and pivot pins 15$^a$ pass loosely through the roller, these pivot pins 15$^a$ being also the pivots by which the adjacent frames 13$^c$ are pivoted together end to end. In this case, the plate 17$^a$ of each spacer frame 13$^c$ does not perform a direct office in spacing and holding the rollers, as it does in the form shown in Figs. 3, etc.; so that the plates 17$^a$ might, in this form of Figs. 8 and 9, be dispensed with entirely, and the flanges 14 would then constitute virtually the whole of the spacer frame.

In Figs. 10, 11 and 12 I illustrate another form in which the spacing frames 13$^d$ are still relatively short in the longitudinal direction along the spring leaves, and are pivoted together end to end at 15$^d$. But in this form each frame 13$^d$ carries a plurality of rollers 11 held between flanges 20$^d$ as illustrated in the drawing. The rollers may preferably be somewhat loose between the flanges, but are held so as to avoid accidental displacement; and the looseness of the rollers is such, that with any ordinary curvature of spring, the rollers may remain in correct bearing engagement with the surfaces of the spring leaves without binding on the flanges and without the necessity of bending the frames 13$^d$. For this purpose such frames as shown at 13$^d$ may be made slightly curved instead of precisely flat, so as to conform to the normal curvature of the spring. These frames 13$^d$ have the flanges 14$^d$ which hang downwardly from the plate 17$^d$; and these flanges may be of such width that they hang downwardly slightly over the edge of the spring leaf directly below them so as to effectively exclude foreign matter. The pivotings at 15$^d$ are preferably on the center lines of the rollers, so that the flexing action of the spring will not cause the rollers to move by moving the frames, as would be the case if the pivots were off the center line.

I have found by experience that when the device is in action the roller has little or no individual movement relative to its carrying frame; so that, with a slight looseness of the roller in the frame, there is no appreciable friction developed between the roller and the carrying frame or the roller holding flanges. There is no appreciable strain on the pivotal connections between the frames, because the slight looseness of the pivotal joints will take care of any slight frame movement.

It will now be seen that I have herein provided a device of simple form which acts efficiently to relieve the ordinary friction generated between the superimposed leaves of such a spring as described. My device almost entirely eradicates that friction; and at the same time it does not at all interfere with the proper resilient movement of each spring leaf. The total result is then that the spring is induced and allowed to have a greater flexibility of resilient action and to have its resilience effectually increased; and this is particularly further induced by the fact that I provide efficient lubricating means and efficient means for preventing deterioration of the bearing by entry of foreign matter.

Having described a preferred form of my invention, I claim:

1. In combination, a spring of the character described having superimposed leaves and roller bearings spaced longitudinally of the leaves between them and extending transversely across the leaves, and holding and spacing frames for the roller bearings embodying relatively short frames each holding a set of said bearings, and adjacent frames being pivotally connected together.

2. In combination, a spring of the character described embodying a plurality of superimposed leaves; spring spacing members between adjacent leaves extending from the center of the leaves part way to their ends: anti-friction roller bearings between the leaves outside of said spacing members embodying a series of rollers extending transversely across the leaves and spaced longitudinally thereon; and carrying and spacing means for the rollers embodying relatively short frames each holding a set of rollers, each frame being pivotally connected to the adjacent frames and the innermost frames pivotally connected to said auxiliary spring members.

3. In combination, a spring of the character described having superimposed leaves, rolling bearings spaced longitudinally of the leaves, and relatively short holding and spacing frames for the rolling bearings, adjacent frames being flexibly connected together.

4. In combination, a spring of the character described having superimposed leaves, rolling bearings spaced longitudinally between the leaves, and relatively short spacing frames for the rolling bearings connected together end to end, said frames having side flanges outside the rolling bearings to close the space between adjacent spring leaves.

5. In combination, a spring of the character described having superimposed leaves, rolling bearings spaced longitudinally between the leaves, sectional flexible bearing spacing means, and side flanges on said means outside the bearings to close the spaces between adjacent spring leaves.

6. In combination, a spring of the character described having superimposed leaves, rolling bearings spaced longitudinally between the leaves, relatively short spacing frames for the rolling bearings connected together end to end, said frames having side flanges outside the rolling bearings to close the space between adjacent spring leaves, and lubricating pads held in the spacing frames.

7. In combination, a spring of the character described having superimposed leaves, rolling bearings spaced longitudinally between the leaves, and spacing members for the rolling bearings pivotally connected together end to end on pivotal axes coincident with the axes of the rolling bearings.

8. In combination, a spring of the character described having superimposed leaves, rolling bearings spaced longitudinally between the leaves, and spacing members for the rolling bearings pivotally connected together end to end on pivotal axes coincident with the axes of the rolling bearings, said spacing members having bearing holding flanges at each of their opposite ends and the rolling bearings being held between opposing flanges of adjacent members.

9. In combination, a spring of the character described having superimposed leaves, rolling bearings spaced longitudinally between the leaves, spacing and holding means for the bearings embodying a plurality of spacing frames pivoted together end to end on axes coincident with the bearing axes, said spacing frames having bearing holding flanges at each of their opposite ends and the rolling bearings being held between opposing flanges of adjacent frames, and side flanges on the opposite sides of each frame outside the rolling bearings to close the space between adjacent leaves and protect the bearings against entry of foreign matter.

10. In combination, a spring of the character described having superimposed leaves, rolling bearings spaced longitudinally between the leaves, and spacing and holding means for the bearings embodying a plurality of spacing frames pivoted together end to end on axes coincident with the bearing axes, each of said spacing frames embodying a flat plate having bearing holding flanges at each of their opposite ends and having side flanges to close the space between adjacent spring leaves.

11. In combination, a spring of the character described having superimposed leaves, rolling bearings spaced longitudinally between the leaves, spacing and holding means for the bearings embodying a plurality of spacing frames pivoted together end to end on axes coincident with the bearing axes, each of said spacing frames embodying a flat plate having bearing holding flanges at each of its opposite ends and having side flanges to close the space between adjacent spring leaves, and lubricating pads carried on the plates within their flanges.

12. In combination, a spring of the character described having superimposed leaves, and antifriction devices between the leaves embodying a plurality of relatively short lubricant carrying members flexibly connected together end to end to form a device flexible longitudinally of the spring leaves.

13. In combination, a spring of the character described having superimposed leaves, rolling bearings spaced longitudinally of the leaves, and sectional spacing members for the rolling bearings, adjacent sections of the members being flexibly connected together.

14. In combination, a spring of the character described having superimposed leaves, anti-friction devices between the leaves embodying rolling bearings, and a plurality of bearing spacing and lubricant carrying members flexibly connected together end to end.

15. In combination, a spring of the character described having superimposed leaves, rolling bearings spaced longitudinally between the leaves, and bearing spacing frames pivotally connected together on axes at the rolling bearings, holding the bearings between adjacent ends of adjacent frames.

16. In combination, a spring of the character described having superimposed leaves, rolling bearings spaced longitudinally between the leaves, and bearing spacing frames pivotally connected together on axes at the rolling bearings, holding the bearings between adjacent ends of adjacent frames, said frames being formed between their ends to carry lubricant.

In witness that I claim the foregoing I have hereunto subscribed my name this 24th day of April, 1917.

JOHN M. HAMILTON

Witness:
JAMES T. BARKELEW.